United States Patent [19]

Gelder et al.

[11] Patent Number: 5,457,838
[45] Date of Patent: Oct. 17, 1995

[54] EXTENDIBLE DOCK LEVELER

[75] Inventors: Kenneth Gelder, West Bend; Gerard M. Palmersheim, Hubertus, both of Wis.

[73] Assignee: Systems, Inc., Germantown, Wis.

[21] Appl. No.: 124,715

[22] Filed: Sep. 21, 1993

[51] Int. Cl.⁶ .................................................. E01D 1/00
[52] U.S. Cl. ........................... 14/69.5; 14/71.3; 14/71.1; 340/540; 414/401
[58] Field of Search .................................. 14/69.5, 71.1, 14/71.3, 71.5, 71.7; 414/396, 401, 584

[56]  References Cited

U.S. PATENT DOCUMENTS

| | | |
|---|---|---|
| 1,967,620 | 7/1934 | Kahn . |
| 2,639,450 | 5/1953 | Ramer . |
| 2,689,965 | 9/1954 | Fenton . |
| 2,881,457 | 4/1959 | Rodgers . |
| 2,881,458 | 4/1959 | Rodgers . |
| 2,993,219 | 7/1961 | Pennington . |
| 3,006,008 | 10/1961 | Loomis et al. . |
| 3,167,796 | 2/1965 | Layne . |
| 3,175,238 | 3/1965 | Pennington . |
| 3,179,968 | 4/1965 | Lambert . |
| 3,235,895 | 2/1966 | Wallace et al. . |
| 3,268,932 | 8/1966 | Hartman . |
| 3,280,414 | 10/1966 | Layne . |
| 3,424,323 | 1/1969 | Barnaby . |
| 3,475,779 | 11/1969 | Johnson . |
| 3,486,181 | 12/1969 | Hecker, Jr. et al. . |
| 3,533,118 | 10/1970 | Rosengen . |
| 3,786,530 | 1/1974 | Le Clear ........................................ 14/71 |
| 3,872,948 | 3/1975 | Richards ............................. 187/8.52 |
| 4,127,856 | 11/1978 | Bickel .................................... 340/687 |
| 4,146,888 | 3/1979 | Grunewald et al. .................. 340/679 |
| 4,155,468 | 5/1979 | Royce ................................... 414/556 |
| 4,191,503 | 3/1980 | Neff et al. ............................. 414/401 |
| 4,207,019 | 6/1980 | Cone ..................................... 414/373 |
| 4,208,161 | 6/1980 | Hipp et al. ............................. 414/401 |
| 4,224,709 | 9/1980 | Alten ...................................... 14/71.7 |
| 4,264,259 | 4/1981 | Hipp ...................................... 414/401 |
| 4,267,748 | 5/1981 | Grunewald et al. ................... 74/529 |
| 4,282,621 | 8/1981 | Anthony et al. ....................... 14/71.1 |
| 4,304,518 | 12/1981 | Carder et al. ......................... 414/495 |
| 4,342,525 | 8/1982 | Mastronuzzi, Jr. ...................... 404/6 |
| 4,364,137 | 12/1982 | Hahn ...................................... 14/71.3 |
| 4,373,847 | 2/1983 | Hipp et al. ............................. 414/401 |
| 4,379,354 | 4/1983 | Hahn et al. ............................ 14/71.3 |
| 4,443,150 | 4/1984 | Hahn et al. ............................ 414/401 |
| 4,472,099 | 9/1984 | Hahn et al. ............................ 414/401 |
| 4,488,325 | 12/1984 | Bennett et al. ........................ 14/71.3 |
| 4,501,042 | 2/1985 | DiFonzo ................................ 14/71.3 |
| 4,551,877 | 11/1985 | Allen ...................................... 14/71.7 |
| 4,553,895 | 11/1985 | Ellis ....................................... 414/401 |
| 4,555,211 | 11/1985 | Metz ...................................... 414/401 |

(List continued on next page.)

FOREIGN PATENT DOCUMENTS

| | | |
|---|---|---|
| 935606 | 10/1973 | Canada . |
| 2296583 | 12/1975 | France . |
| 2634652 | 2/1968 | Germany . |
| 2852888 | 8/1980 | Germany . |

OTHER PUBLICATIONS

Rite–Hite "HD–3000 Safe–T–Lip Leveler" brochure.

*Primary Examiner*—Ramon S. Britts
*Assistant Examiner*—Pamela A. O'Connor
*Attorney, Agent, or Firm*—Reinhart, Boerner, Van Dueren, Norris & Rieselbach

[57]  ABSTRACT

A dock leveler for providing a bridge into the rear end of a truck trailer over which a fork vehicle can travel in loading the truck trailer. The dock leveler includes a ramp with a rear section and an extendible forward section. The forward section telescopically extends from and retracts into the rear section under power from a hydraulic cylinder. The forward section can be locked in place to prevent retraction of said forward section relative to said rear section under the traction developed by the drive wheels of a fork vehicle as the fork vehicle travels over the dock leveler. Various structures for indicating the amount of overlap of the dock leveler on the truck trailer are also provided.

19 Claims, 5 Drawing Sheets

U.S. PATENT DOCUMENTS

| | | | |
|---|---|---|---|
| 4,560,315 | 12/1985 | Hahn | 414/401 |
| 4,589,813 | 5/1986 | Hagen et al. | 414/401 |
| 4,601,502 | 7/1986 | Van Dyke | 292/252 |
| 4,605,353 | 8/1986 | Hahn et al. | 414/401 |
| 4,630,989 | 12/1986 | Davey | 414/401 |
| 4,634,334 | 1/1987 | Hahn et al. | 414/401 |
| 4,674,941 | 6/1987 | Hagemann | 414/401 |
| 4,692,755 | 9/1987 | Hahn | 340/687 |
| 4,695,216 | 9/1987 | Eriandsson | 414/401 |
| 4,728,242 | 3/1988 | Eriandsson | 414/401 |
| 4,735,542 | 4/1988 | Fisher et al. | 414/401 |
| 4,744,121 | 5/1988 | Swessel et al. | 14/71.7 |
| 4,759,678 | 7/1988 | Hageman | 414/401 |
| 4,767,254 | 8/1988 | Kovach et al. | 414/401 |
| 4,815,918 | 3/1989 | Bennett et al. | 414/401 |
| 4,819,770 | 4/1989 | Hahn | 188/284 |
| 4,830,563 | 5/1989 | Yeakle | 414/401 |
| 4,843,373 | 6/1989 | Trickle et al. | 340/540 |
| 4,848,732 | 7/1989 | Rossato | 254/90 |
| 4,861,217 | 8/1989 | Eriandsson | 414/401 |
| 4,865,507 | 9/1989 | Trickle | 414/401 |
| 4,865,508 | 9/1989 | Carlson | 414/401 |
| 4,920,598 | 5/1990 | Hahn | 14/71.1 |
| 4,938,647 | 7/1990 | Eriandsson | 414/401 |
| 4,969,792 | 11/1990 | Ellis et al. | 414/401 |
| 4,973,213 | 11/1990 | Eriandsson | 414/401 |
| 4,988,254 | 1/1991 | Alexander | 414/401 |
| 4,995,130 | 2/1991 | Hahn et al. | 14/71.3 |
| 5,026,242 | 6/1993 | Alexander | 414/401 |
| 5,040,258 | 8/1991 | Hahn et al. | 14/71.3 |
| 5,047,748 | 9/1991 | Trickle | 340/542 |
| 5,071,306 | 12/1991 | Alexander | 414/401 |
| 5,096,359 | 3/1992 | Alexander | 414/401 |
| 5,120,181 | 6/1992 | Alexander | 414/401 |
| 5,212,864 | 5/1993 | Hahn | 14/69.5 |

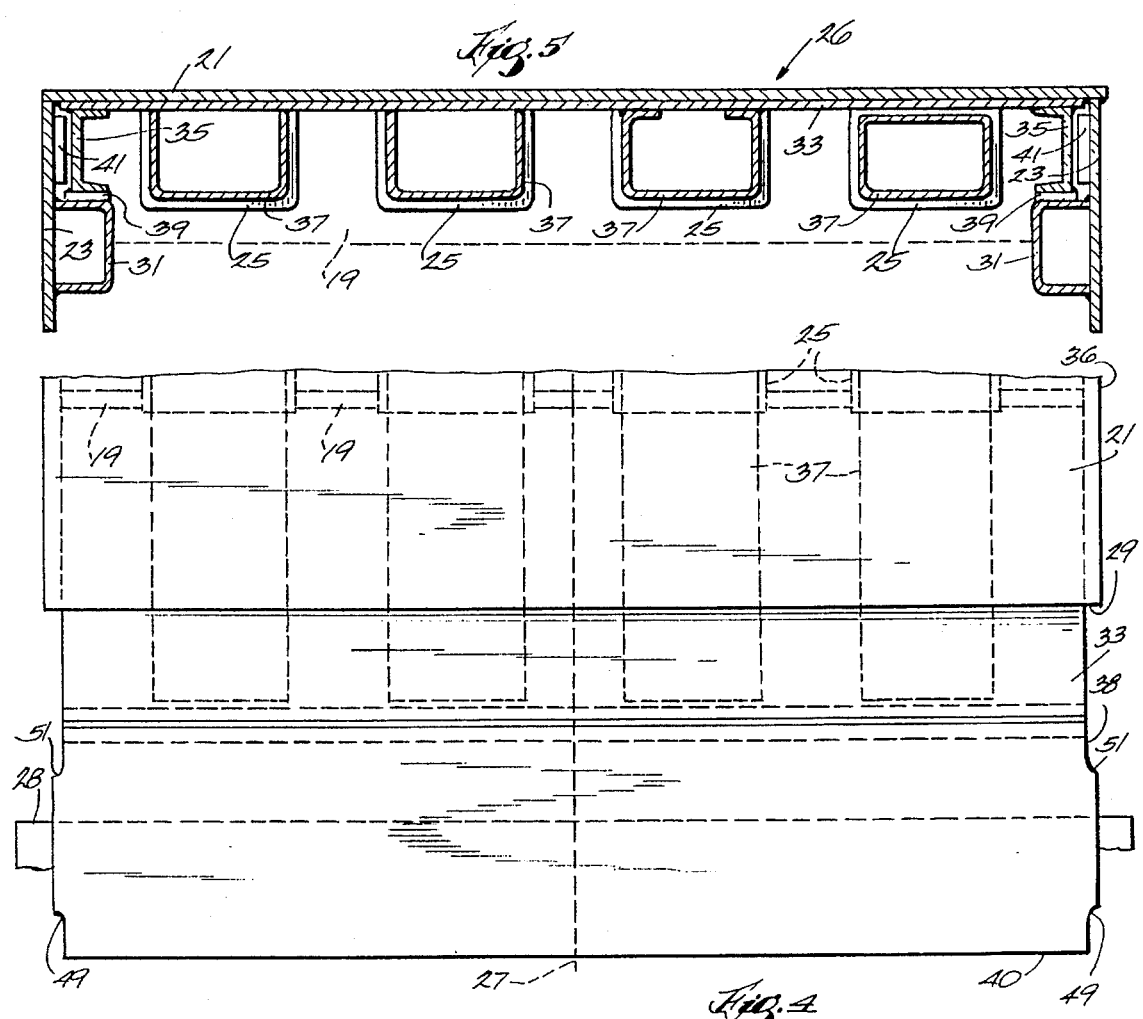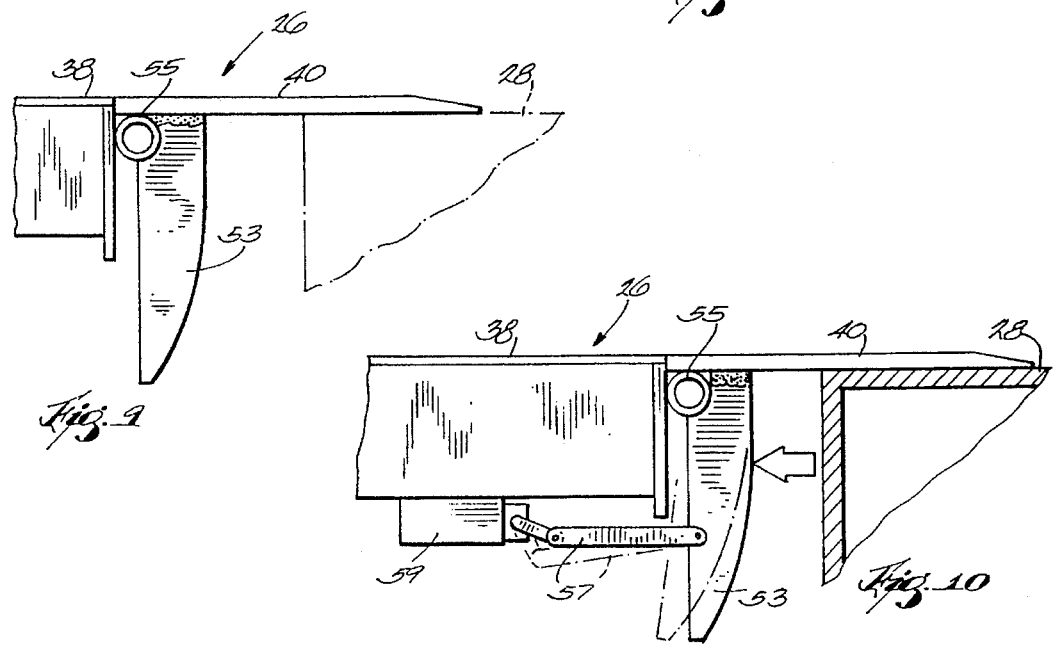

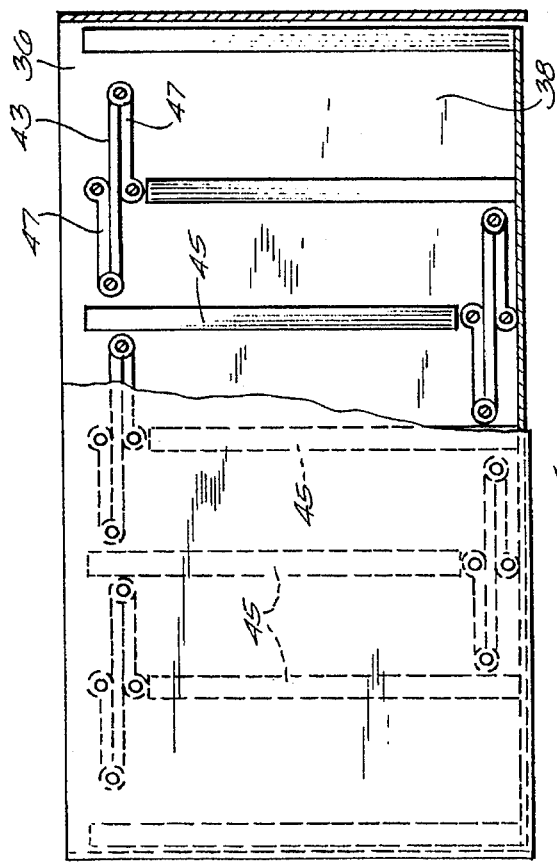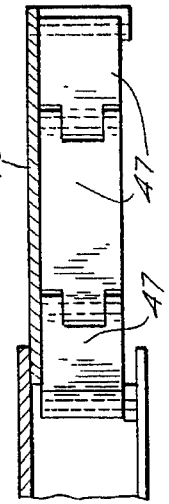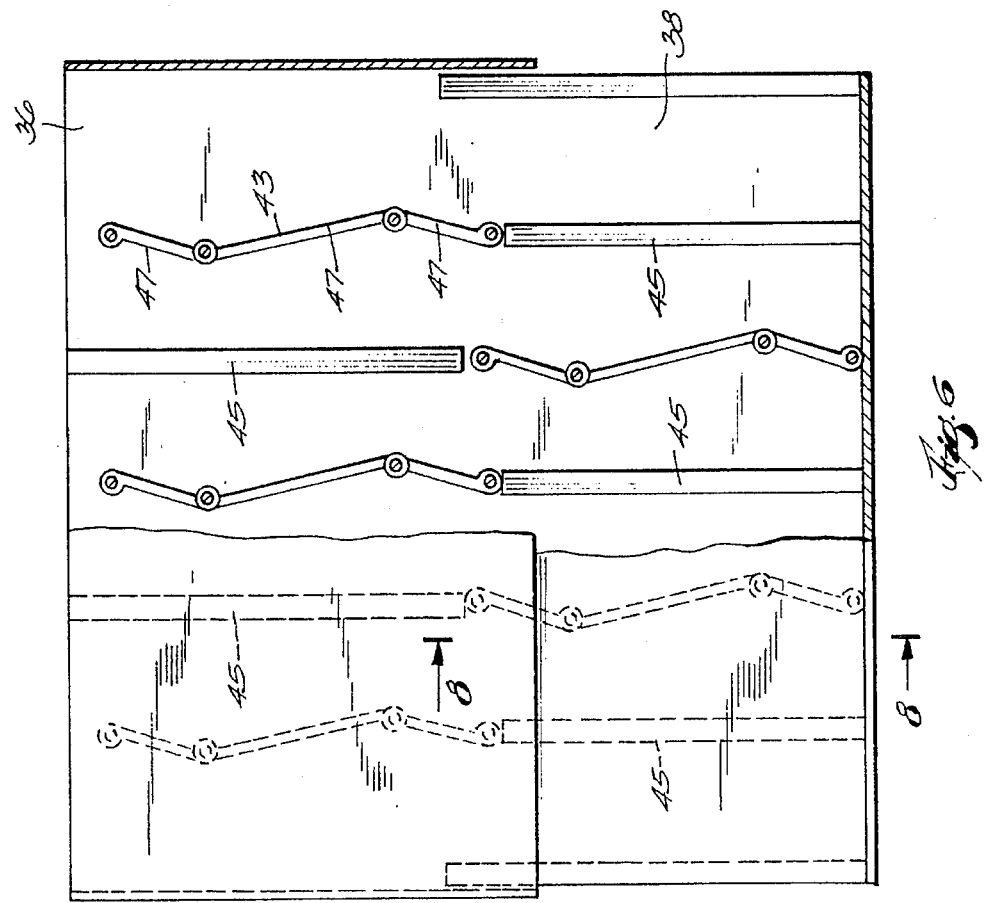

EXTENDIBLE DOCK LEVELER

BACKGROUND OF THE INVENTION

This invention relates generally to dock levelers and, more particularly, to extendible dock levelers.

Dock levelers are typically installed in the loading dock areas of factories, warehouses and similar facilities. In use, a dock leveler serves primarily as a ramp or bridge that extends from the loading dock area of the factory or warehouse into the rear end of a truck trailer. Known dock levelers include hydraulically actuated, extendible levelers wherein a forward section of a movable ramp can be extended or retracted to vary the effective length of the ramp.

When a dock leveler is placed into a track trailer, the amount of "lip purchase" (i.e., the amount by which the dock leveler extends into and overlaps the edge of the mack trailer) is an important consideration. Too little lip purchase can create an unsafe condition. Too much lip purchase can result in physical damage to both the mack trailer and the dock leveler.

In prior dock levelers, the appropriate amount of lip purchase was estimated by the operator, assuming the operator gave conscious thought to the matter at all. Frequently, the resulting amount of lip purchase was not something arrived at after careful thought and consideration but, rather, was determined intuitively on the basis of what "looked right." Although such an intuitive approach was effective when skilled and experienced operators were available, a potential for mishap existed when careless or inattentive operators were involved.

Another potential for mishap occurred when the forward section of an extendible leveler was forced backwardly toward the rear section of the leveler by the drive wheels of a forklift or other vehicle. Such unintended movement shortened the overall effective length of the ramp and reduced the resulting lip purchase. Although the lip purchase might have been acceptable when initially set, an unacceptably small lip purchase might have resulted following such unintended movement.

Examples of hydraulically actuated, extendible dock levelers are shown in the following U.S. patents:

U.S. Pat. No. Inventor Issue Date 4,551,877 Alten Nov. 12, 1985

4,224,709 Alten Sep. 30, 1980

3,235,895 Wallace, et al. Feb. 22, 1966

3,179,968 Lambert Apr. 27, 1965

3,175,238 Pennington Mar. 30, 1965

3,167,796 Layne Feb. 2, 1965

2,689,965 Fenton Sep. 28, 1954

In each of the systems shown in these patents the amount of lip purchase was left to the operator's discretion, and no structure was provided for carefully setting or maintaining the amount of lip purchase.

SUMMARY OF THE INVENTION

The invention provides a dock leveler comprising a ramp having a rear section and an extendible forward section. Structure is provided for extending the forward section relative to the rear section, and an indicator is provided for indicating when the forward section has been sufficiently extended so as to achieve a lip purchase between predetermined minimum and maximum lip purchase limits.

The invention also provides a dock leveler for providing a bridge into the rear end of a truck trailer. The dock leveler includes a ramp having a rear section and an extendible forward section, and further includes structure for extending the forward section relative to the rear section so as to place a portion of the forward section into the rear end of the truck trailer. The dock leveler includes still additional structure for sensing if the amount by which the portion of the front section extends into the truck trailer is less than a predetermined minimum, and further includes structure for providing a warning in the event the amount by which the portion of the forward section extends into the track trailer falls below the predetermined minimum.

The invention also provides a dock leveler for providing a bridge into the rear end of a truck trailer over which a fork vehicle can travel in loading the truck trailer. The dock leveler includes a ramp having a rear section and an extendible forward section. The dock leveler further includes structure for extending and retracting the forward section relative to the rear section and for locking the forward section relative to the rear section. The locking structure prevents retraction of the forward section relative to the rear section under the traction developed by the drive wheels of the fork vehicle as the fork vehicle travels over the ramp.

It is an object of the present invention to provide a new and improved dock leveler.

It is a further object of the present invention to provide a new and improved dock leveler wherein a desired lip purchase can readily be achieved and maintained.

It is a further object of the present invention to provide a new and improved dock leveler wherein reduced lip purchase resulting from unintended retraction of the forward section relative to the rear section is substantially avoided.

It is an additional object of the invention to provide an improved extension mechanism for a dock leveler.

It is another object of the present invention to provide a lip purchase indicator for a dock leveler which provides a warning if the lip purchase falls below a predetermined minimum.

It is a further object of the present invention to provide an improved lip purchase indicator which indicates when sufficient lip purchase has been achieved.

It is an additional object of the present invention to provide a replaceable wear structure for an extendible dock leveler.

It is yet another object of the present invention to provide an improved method of welding components of a dock leveler to provide increased structural strength.

It is a further object of the present .invention to provide a dock leveler including a barrier capable of preventing a fork track from rolling off a dock when the dock leveler is not in use.

It is a further object of the present invention to provide an improved barrier for preventing a fork truck from rolling off a dock and/or damaging a retractable door when the dock leveler is not being used to access a truck trailer.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 4 is fragmentary top plan view of an extendible ramp incorporated in the dock leveler of FIGS. 1–3 showing one form of lip purchase limit structure constructed in accordance with one aspect of the invention;

FIG. 5 is a cross sectional view of the extendible ramp shown in FIG. 4;

FIG. 6 is a diagrammatic top view of an alternate embodiment extendible ramp constructed in accordance with one aspect of the invention, showing the ramp in an extended position;

FIG. 7 is a diagrammatic view of an alternate embodiment ramp shown in FIG. 6 showing the ramp in a retracted position;

FIG. 8 is a cross sectional view of the alternate embodiment extendible ramp shown in FIG. 6 taken along line 8—8 thereof;

FIG. 9 is a fragmentary side elevation view of another form of lip purchase limiting device constructed in accordance in one aspect of the invention;

FIG. 10 is a fragmentary side view of still another lip purchase limiting mechanism constructed in accordance with one aspect of the invention;

DESCRIPTION OF THE PREFERRED EMBODIMENT

Figure 1:
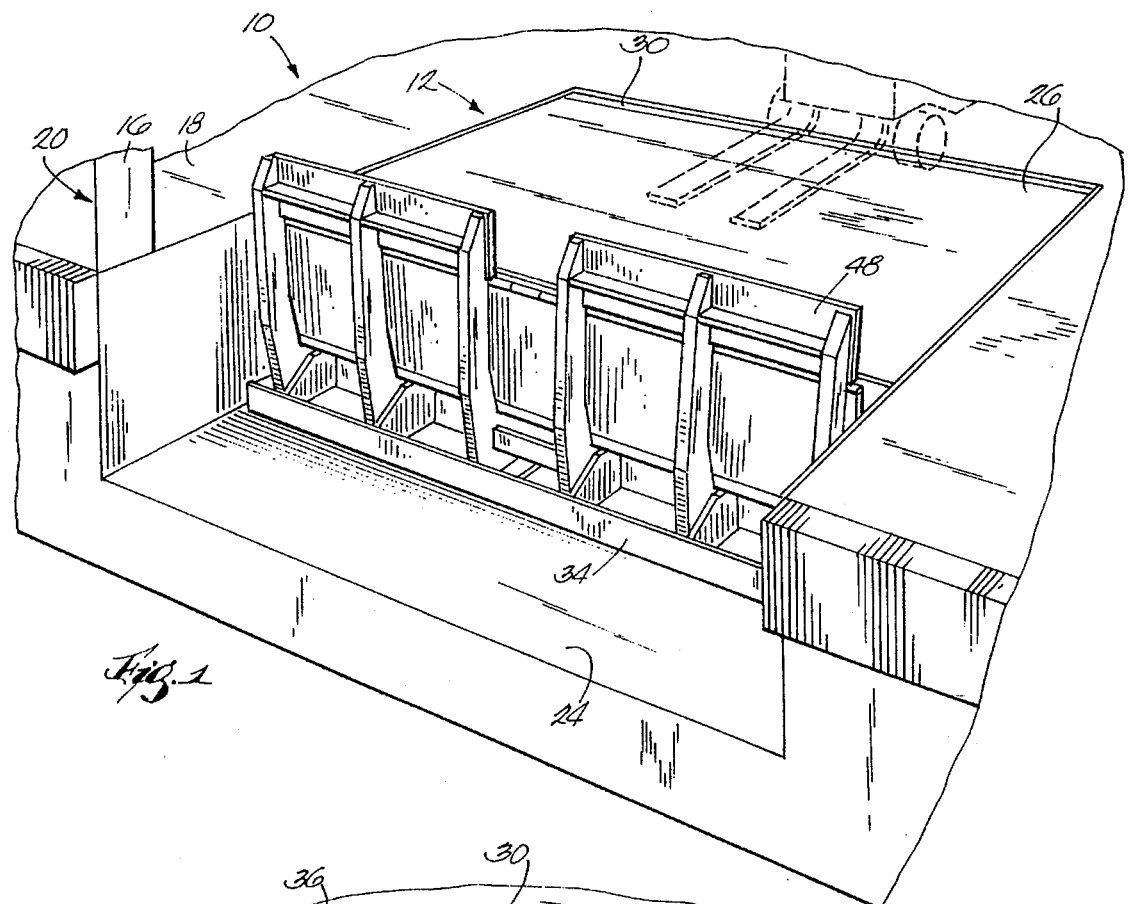
FIG. 1 is a perspective view of a loading dock, including a dock leveler embodying various features of the invention, showing the dock leveler in a retracted or storage position.
Figure 3:
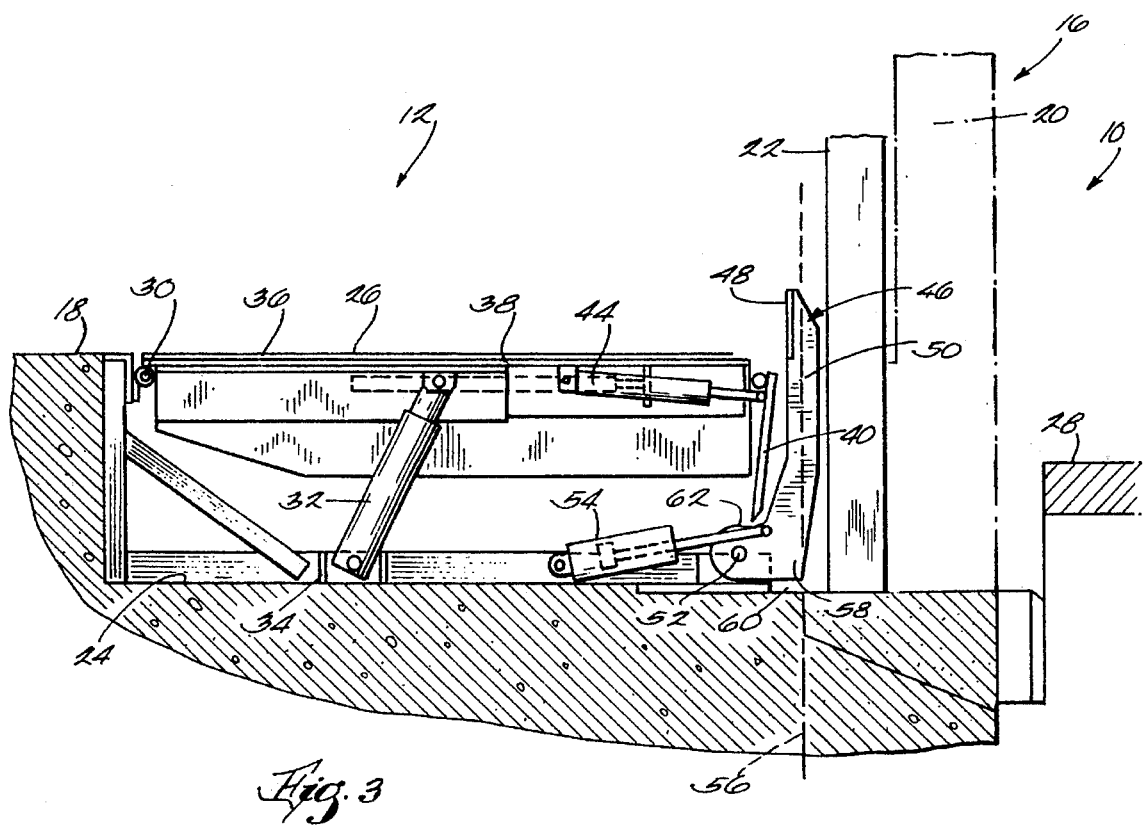
FIG. 3 is a side elevation view of the loading dock shown in FIGS. 1 and 2.

Referring to the drawings and, in particular, to FIGS. 1 and 3, a loading dock 10 including an extendible dock leveler 12 embodying various features of the invention is illustrated. The loading dock 10, in accordance with conventional practice, is located adjacent the vertical exterior wall 16 (FIG. 3) of a factory, warehouse or similar facility. The facility includes a dock floor 18, and the wall 16 extends upwardly from the dock floor 18. The wall 16 includes an opening 20 through which freight or other goods can be loaded and unloaded. An overhead door 22 adjacent the inner side of the wall 16 allows the opening 20 to be opened or closed as desired. The dock leveler 12 itself is located in a pit 24 formed in the dock floor 18.

The dock leveler 12 generally includes a movable ramp 26 that serves as a bridge between the dock floor 18 and the bed of the truck trailer 28 backed up against the loading dock 10. Because truck trailer beds are not all of uniform height above ground, the ramp 26 can be pivoted up or down relative to the dock floor 18. To this end, the dock leveler 12 includes a horizontal pivot 30 along the rear edge of the ramp 26. A hydraulic hoist cylinder 32, connected at one end to the underside of the ramp 26, functions to move the ramp 26 around the pivot 30 to raise or lower the ramp 26 relative to the dock floor 18. In the illustrated embodiment, the dock leveler 12 includes a framework 34 that is received in the pit 24 in the dock floor 18. The opposite end of the hydraulic hoist cylinder 32 is coupled to the framework 34 as is the pivot 30 at the rear of the ramp 26.

In accordance with one aspect of the invention, the ramp 26 is configured so that it can be retracted to remain fully within the facility when the loading dock 10 is idle and the overhead door 22 is closed (FIG. 3). To this end, the dock leveler 12 is extendible and includes a rear ramp section 36 and a forward ramp section 38 telescopingly received in the forward end of the rear ramp section 36. An extendible lip 40 is preferably pivotally attached at the forward end of the forward ramp section 38. Alternatively, the lip 40 can be fixed relative to the forward ramp section 38. One or more hydraulically actuated extension cylinders 42 (FIGS. 12 and 13), having one end coupled to the rear ramp section 36 and another end coupled to the forward ramp section 38, move the ramp 26 between a retracted position, wherein the forward ramp section 38 is retracted relative to the rear ramp section 36, and an extended position wherein the forward ramp section 38 is extended relative to the rear ramp section 36. The lengths of the rear ramp section 36 and the forward ramp section 38 are selected so that when the ramp 26 is retracted it is inboard of the overhead door 22, and when the ramp 26 is extended, it extends sufficiently far beyond the vertical exterior wall 16 to reach over part of the bed 28 of the track trailer. A hydraulic cylinder 44 extends and lowers the lip 40.

Figure 2:
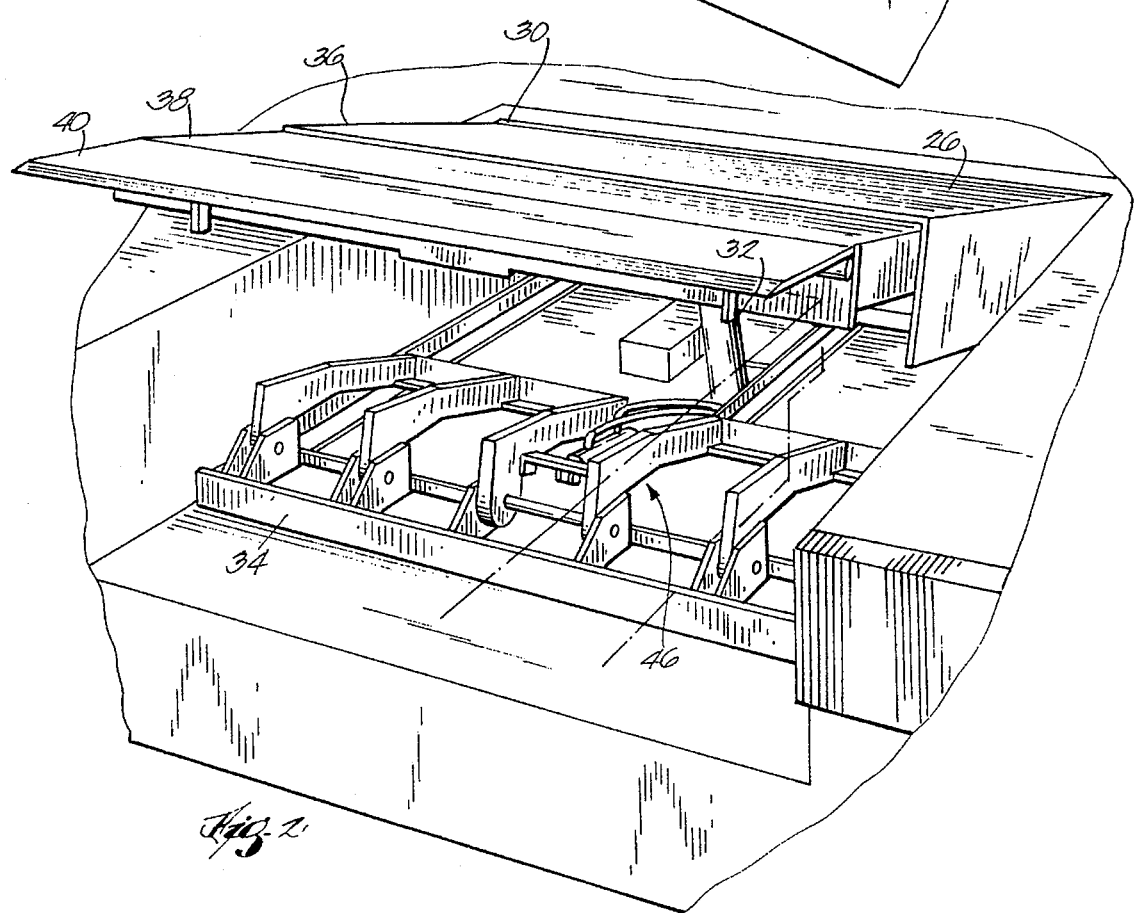
FIG. 2 is a perspective view similar to FIG. 1 showing the dock leveler in a raised and extended position.

In one embodiment, the dock leveler 12 includes a barrier mechanism 46 for preventing vehicles from inadvertently falling off the forward end of the ramp 26 when the dock leveler 12 is idle. Such a barrier is shown and described in the co-pending application of Gelder, et al., Ser. No. 08/124, 449, filed concurrently herewith and incorporated by reference in its entirety herein. The barrier 46 is mounted for movement between a lowered position wherein no portion of the barrier 46 projects above the level of the upper surface of the ramp 26, and a raised position wherein an upwardly extending portion of the barrier 46 does project above the level of the upper surface of the ramp 26. In the embodiment illustrated in FIGS. 2 and 3, the barrier 46 comprises a horizontal plate 48 that is welded or otherwise joined to one end of one or more elongate barrier arms 50. The opposite ends of the arms 50 are mounted for pivoting movement around a pivot axis 52 located below the ramp 26 approximately under the forward end of the forward ramp section 38 when the ramp 26 is fully retracted. The length of the arms 50 is such that, when the barrier 46 is moved to the raised position, the ends of the arms 50 and the plate 48 affixed thereto project above the upper surface of the ramp 26 when the ramp 26 is in the retracted, horizontal, idle or storage position.

The barrier 46 is moved between the lower and raised positions by means of a hydraulic barrier cylinder 54 having one end coupled to the arms 50 and another end coupled to the frame 34 of the dock leveler 12 (as shown in FIG. 3). When the barrier cylinder 54 extends, the barrier 46 is raised. When the barrier cylinder 54 retracts, the barrier 46 is lowered.

The construction of the ramp 26 is best seen in FIGS. 4 and 5. Preferably, each of the forward and rear ramp sections 38, 36 is formed of welded steel plate. The rear ramp section 36 includes a horizontal upper plate 21 and a pair of downwardly depending side plates 23 welded to the edges thereof. A header 19 extends across the front of the rear ramp section 36. A plurality of rectangularly sectioned, parallel, longitudinally extending support tubes or channel members 25 are welded to the underside of the upper plate 21 parallel to the central longitudinal axis 27 thereof. Each of the channel members 25 terminates well short of the forward edge 29 of the rear ramp section upper plate 21. A similarly shaped tube or channel member is welded to each of the side plates 23 at a point spaced vertically from the underside of the upper plate 21 to form a pair of parallel side rails 31 as best seen in FIG. 5.

The forward ramp section 38 comprises a horizontal steel top plate 33 having a rigid elongate channel member or side member 35 welded along each edge on the underside thereof. A plurality of rectangularly sectioned tube or channel members 37 are welded to the underside of the forward ramp upper plate 21 and are located and dimensioned to be telescopingly received in the channel members 25 of the rear ramp section upper plate 21. The inner channel members 37 project beyond the rear edge of the forward ramp section upper plate 33 to permit telescoping movement of the forward ramp section 38 relative to the rear ramp section 36 between the extended and retracted positions.

To facilitate sliding movement of the forward ramp section 38 relative to the rear ramp section 36, a pair of wear bars 39 are installed between the upper surface of the rear ramp section side rails 31 and the undersurface of the side members 35 of the forward ramp section 38. An additional pair of wear bars 41 are provided between each of the side members 35 of the forward ramp section 38 and the side plates 23 of the rear ramp section 36. The wear bars 39 and 41 are preferably formed of a durable material such as Nylon or other molded plastic that has a low coefficient of friction and is softer than the steel of the side rails 31 and side members 35. In use, wear that results as the forward ramp section 38 slides relative to the rear ramp section 36 occurs primarily in the wear bars 39, 41 rather than in the metallic components. When worn, the wear bars 39, 41 can be economically and easily replaced. Use of the wear bars 39, 41 thus substantially avoids permanent wear in the metallic components of the dock leveler 12, thereby significantly decreasing maintenance costs and increasing the effective life of the dock leveler 12.

As illustrated at the left-hand side of FIG. 5, the edges of the channel members 25, 37 can be left square and the channel members 25, 37 welded to the underside of the ramp upper plates 21, 33 by means of a simple fillet weld along the exposed outer edge thereof. Alternatively, as shown toward the right-middle side of FIG. 5, the edges of the channel members 25, 37 can be inwardly bent before welding to the undersurface of the ramp upper plates 21, 33. Such alternative construction provides somewhat greater strength and rigidity due to greater welded surface area in the resulting structure. Similarly, the welds at the juncture between the side plates 23, 35 and upper plates 21, 33 of the forward and rear ramp sections 38, 36 can comprise a single fillet weld along the inner corners thereof as shown at the left-hand side of FIG. 5. Alternatively, the upper plates 21, 33 can extend slightly beyond the upper edges of the side plates 23, 35 and a fillet weld formed along both sides of the side plates 23, 35 as shown at the right-hand side of FIG. 5. Again, the alternative construction results in a structure that is somewhat more rigid and durable than a structure utilizing single welds only. Finally, the channel members 25 and 37 can comprise rectangular tubing as shown at the right-hand side of FIG. 5 for even greater rigidity and strength.

An alternative ramp construction is shown in FIGS. 6, 7 and 8. In this construction, the telescoping channel members 25, 37 are dispensed with, and telescoping movement of the forward ramp section 38 relative to the rear ramp section 36 is provided by means of a plurality of folding links 43. The forward and rear ramp sections 38, 36 are provided with interleaved rigid bars 45 that extend alternately from the forward end 29 of the forward ramp section 38 and the rear end of the rear ramp section 36. A folding link 43, comprising a plurality of rigid, hinged plates 47, extends between the inner end of each rigid bar 45 and the opposite end wall of the forward or rear ramp section 38, 36.

As best seen in FIG. 6, when the forward ramp section 38 is extended relative to the rear ramp section 36, the folding links 43 are extended. By virtue of their widths and strong hinges (best seen in FIG. 8), the folding links 43 resist downward bending of the forward ramp section 38 relative to the rear ramp section 36 to help maintain the stability and rigidity of the ramp 26 when the ramp 26 is in an extended condition. When the ramp 26 is retracted, the folding links 43 fold as best seen in FIG. 7 to permit retraction of the forward ramp section 38 relative to the rear ramp section 36.

In accordance with another aspect of the invention, structure is provided for enabling the dock leveler operator to determine when the lip purchase (.i.e., the amount by which the dock leveler extends into and overlaps the edge of the truck trailer) is between pre-established minimum and maximum limits.

In the embodiment illustrated in FIG. 4, each side of the extendible lip 40 includes a pair of forward and rear cutouts or notches 49, 51 that are located at predetermined distances from the forward and rear edges, respectively, of the lip 40. The location of the forward notches or cutouts 49 establishes the minimum lip purchase limit, while the rear notches 51 establish the maximum lip purchase limit. In use, the operator extends the forward section 38 of the ramp 26 sufficiently far so that the end of the truck trailer 28 falls between the forward and rear notches 49, 51. When the end of the truck trailer 28 is so positioned, the resulting lip purchase is between the maximum and minimum limits. The operator must watch the ramp lip 40 as the ramp 26 is extended and lowered into place to ensure that the end of the track trailer 28 falls between the notches 49, 51. This forces the operator to remain in the control "loop" to ensure human control over the resulting lip purchase.

An alternative maximum lip purchase limiting system in shown in FIG. 9. In this system, a plurality of downwardly depending elongate plates 53 are welded or otherwise fixed to the underside of the lip 40 adjacent the hinge connection 55 to the forward ramp section 38. When the lip 40 is extended to the horizontal position shown, the downwardly depending plates 53 form a barrier against which the end of the track trailer 28 bears in the event the ramp 26 is extended too far. Contact between the track trailer 28 and the plates 53 signals the operator to limit further extension of the ramp 26.

Still another alternate maximum lip purchase limiting structure is shown in FIG. 10. In this embodiment, the downwardly depending plates 53 are coupled through a linkage 57 to a limit switch 59 that automatically halts further extension of the forward ramp section 38 when the maximum lip purchase limit is exceeded. In the event the forward ramp section 38 is extended too far, thereby causing the plates 53 to contact the rear edge of the truck trailer 28, the resulting contact actuates the limit switch 59 by means of the linkage 57 to terminate further extension of the forward ramp section 38. The limit switch 59 can activate a buzzer, horn, light or similar device to warn the operator, or the switch 59 can control a solenoid-controlled valve in the dock leveler hydraulic circuitry to automatically halt further extension of the forward ramp section 38.

In another embodiment of the invention, another limit switch 59 can be located to sense "trailer creep" (i.e., unintended movement of the truck trailer away from the loading dock) and the resulting decrease in lip purchase. Similarly, a warning device can be actuated when the lip purchase reaches a predetermined minimum. Alternatively, optical sensors, (such as photoelectric sensors, photodiodes, transistors and the like) density sensors or the like can be used to perform the functions of the limit switch 59.

Figure 11:
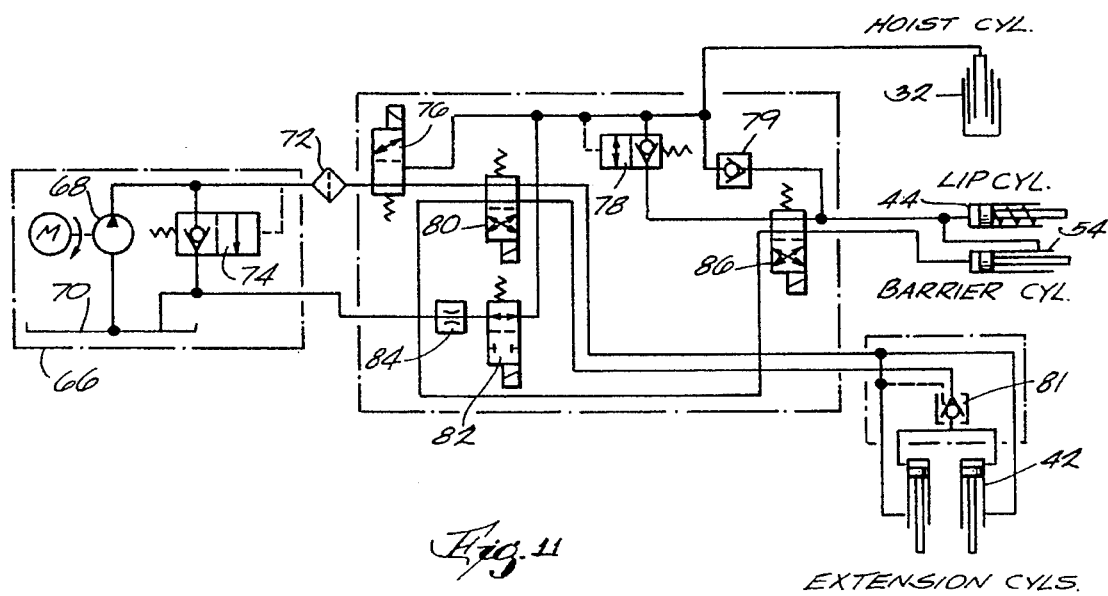
FIG. 11 is a schematic diagram of a hydraulic system incorporated in one embodiment of the dock leveler shown in FIGS. 1–3.

A hydraulic circuit 64 suitable for use with the dock leveler 12 herein described is shown in the schematic diagram of FIG. 11. Pressurized hydraulic fluid is provided by a hydraulic power pack 66 that includes a motor driven pump 68. The motor driven pump 68 draws hydraulic fluid from a reservoir 70 and pumps it through a filter 72 to the various hydraulic cylinders. Protection against overpressure conditions is provided by means of a pilot actuated pressure relief valve 74.

When the dock leveler 12 is to be actuated from the storage or idle position, pressurized hydraulic fluid is initially provided to the hoist cylinder 32 through a solenoid controlled directional control valve 76. After the hoist cylinder 32 is fully extended as shown in FIG. 12, hydraulic pressure in the hydraulic line to the hoist cylinder 32 rises until it is sufficiently high to open a pilot actuated relief valve 78. When open, the pilot actuated pressure relief valve 78 diverts the hydraulic fluid to the lip hydraulic cylinder 44 and the barrier cylinder 54. This causes the lip hydraulic cylinder 44 to extend and thereby extend the lip 40. It will be appreciated that the lip 40 extends only after the ramp 26 is raised. At the same time, the barrier cylinder 54 is retracted causing the barrier 46 to rotate to the lowered position. A check valve 79 isolates the lip hydraulic cylinder 44 from the hoist cylinder 32 to keep the lip 40 extended as the ramp 26 is lowered.

After the ramp 26 is raised, and after the lip 40 is extended and the barrier 46 lowered, a normally open solenoid controlled two-way valve 82 closes thereby locking the hoist cylinder 32, the lip hydraulic cylinder 44 and the barrier cylinder 54 in their then current positions. Next, a solenoid controlled crossover valve 80 is actuated causing hydraulic fluid from the hydraulic power pack 66 to be applied through a pilot actuated check valve 81 to the extension cylinders 42. The extension cylinders 42, in turn, extend the forward ramp section 38 of the ramp 26. After the forward ramp section 38 is extended, hydraulic fluid from the hoist cylinder 32 and the lip hydraulic cylinder 44 is allowed to bleed back to the reservoir 70 through a solenoid controlled directional control valve 82 and a variable flow restrictor 84. This causes the extended ramp 26 to lower, slowly, down to the level of an adjacent truck trailer bed 28. In addition, the fluid flow from the hoist cylinder 32 through the control valve 82 and flow restrictor 84 allows the position of the ramp 26 to change or float with changes in the height of the truck trailer as the truck trailer is loaded and unloaded. The dock leveler 12 remains in this condition until the leveler 12 is to be placed in the storage condition once again.

The check valve 81 prevents unintended fluid flow from the extension cylinders 42 and helps ensure that the cylinders 42 remain extended even if pressure drops in the supply line to the extension side of the cylinders 42. This, in turn, ensures that the ramp 26 remains extended even under the retroactive force generated by the drive wheels of a fork vehicle as the vehicle drives over the ramp. Such unintended retraction of the ramp 26 could have adverse safety consequences. When it is desired to retract the ramp 26, hydraulic pressure on the retraction side of the extension cylinders 42 applies a pilot signal to the check valve 81 to open the valve 81 and permit fluid flow from the cylinders 42.

Figure 13A:
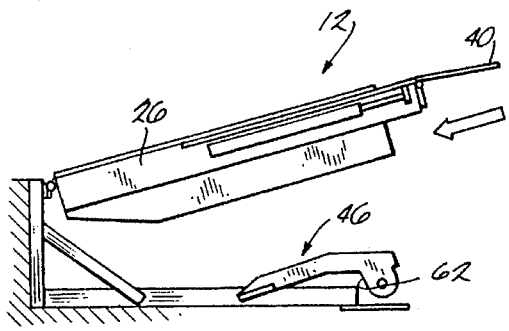
FIGS. 13a–13b are diagrammatic views, similar to FIGS. 12a–12d, showing the dock leveler transitioning from the extended or use position to the retracted or storage position.

To return the dock leveler 12 to the storage position, the solenoid controlled directional control valve 76 is once again actuated to raise the ramp 26 and extend the lip 40 as illustrated in FIG. 13a. Thereafter, the solenoid controlled crossover valve 80 is opened causing the extension cylinders 42 to retract the extended forward ramp section 38. Another solenoid controlled crossover valve 86 is actuated causing the barrier cylinder 54 to extend and thereby raise the barrier 46. The solenoid controlled directional control valve 76 is closed once again and the solenoid controlled directional control valve 82 is opened permitting the hoist cylinder 32 to bleed slowly through the variable flow restrictor 84 thereby lowering the ramp 26.

Actuation of the various solenoid controlled valves can be provided through a suitable operator control panel to provide manual control of the dock leveler 12. Alternatively, appropriately located limit switches can be included to control the sequential actuation of the solenoid controlled valves. Or, a suitably programmed microprocessor-based control system can be included to provide fully automatic electronic control of the dock leveler 12.

The sequential operations required to move the dock leveler 12 from the storage or idle position to the use position are shown in FIGS. 12a–12d.

Figure 12A:
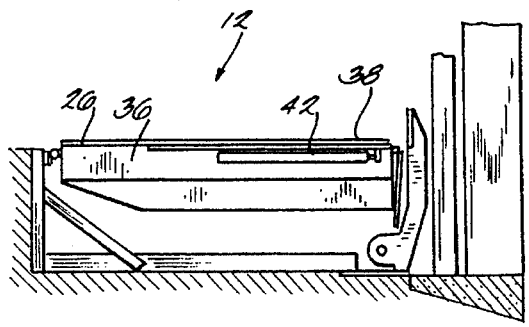
FIGS. 12a–12d are diagrammatic views of the dock leveler illustrated in FIG. 1 showing the dock leveler transitioning from the retracted or storage position to the extended or use position.

In FIG. 12a, the extendible ramp 26 is retracted and is level with the dock floor 18. The barrier 46 is raised and is positioned between the forward end of the ramp 26 and the closed overhead door 22. The lip 40 is lowered and rests on the shelf 62 formed by the barrier arms 50.

Figure 12B:
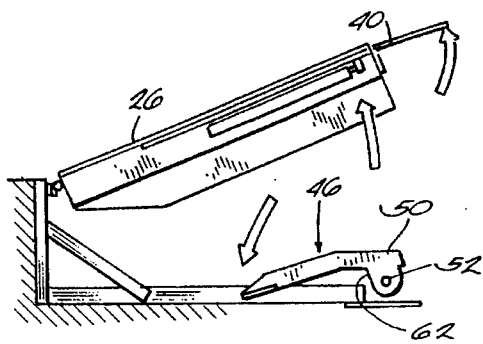

In FIG. 12b, the overhead door 22 has been raised allowing the ramp 26 to be raised sufficiently to allow the barrier 46 to be rotated downwardly from the raised position to the lowered position. Once the barrier 46 has reached the lowered position, the lip 40 and the forward ramp section can be extended. The ramp 26 is held up hydraulically.

Figure 12C:
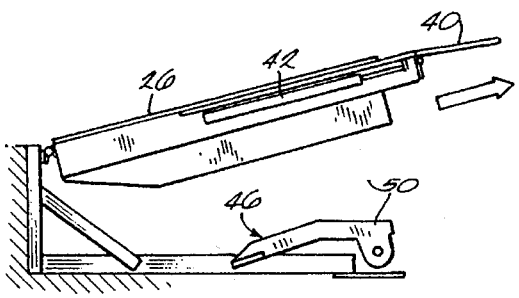

In FIG. 12c, the barrier 46 has been completely lowered, the lip 40 has been extended and the forward ramp section 38 is being extended relative to the rear ramp section 36 to increase the overall effective length of the ramp 26.

Figure 12D:
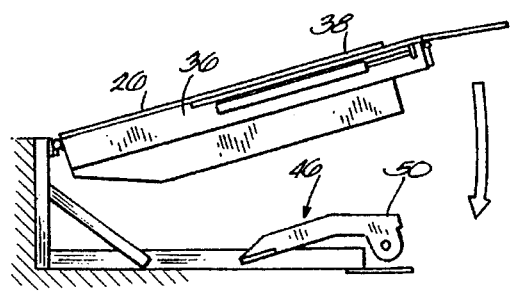

In FIG. 12d, the ramp 26 has been fully extended and the ramp 26 is pivoted downwardly until the lip 40 reaches and contacts the truck trailer bed 28 (FIG. 3). In addition, the hydraulic lift applied to the ramp 26 is released to allow the ramp 26 to float with changes in the truck trailer 28 height as the truck trailer 28 is loaded and unloaded.

Figure 13B:
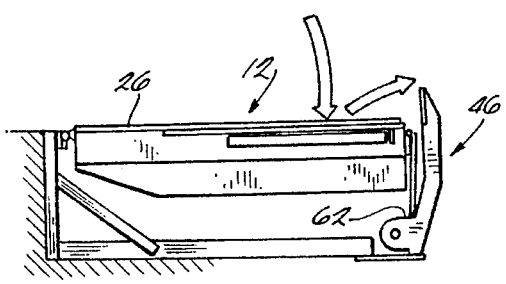

The sequence for placing the dock leveler 12 back into the idle position is shown in FIGS. 136a and 13b. Initially, the ramp 26 is pivoted to the fully raised position whereupon the forward ramp section 38 is retracted and the lip 40 is lowered. Thereafter, the ramp 26 is maintained in the raised position while the barrier 46 is raised. After the barrier 46 is fully raised, the ramp 26 is pivoted downwardly to the horizontal idle position with the outermost edge of the lip 40 contacting the shelf 62 formed by the barrier arms 50.

It will be appreciated that various modifications can be made in the dock leveler. For example, the number and location of the channel members or folding links can be varied to suit the size and desired capacity of the dock leveler. Also, maximum and minimum lip purchase indicators can be located on the forward ramp section rather than the lip and compared against reference marks on the dock floor or wall. Furthermore, although preferred forms of welded joints are shown and described, other joints can be utilized. Although plate steel is preferably utilized in the construction of the dock leveler, other materials might be substituted. Additionally, other forms of hydraulic circuitry can be used, and other forms of actuating devices, such as pneumatic cylinders, can be used. Finally, the dimensions and relative proportions herein shown and described are intended to be illustrative rather than limiting.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A dock leveler comprising:
   a ramp having a rear section and an extendible forward section;
   means for extending said forward section relative to said rear section; and
   indicator means for indicating when said forward section has been sufficiently extended so as to achieve a lip purchase between predetermined minimum and maximum lip purchase limits.

2. A dock leveler as defined in claim 1, wherein said indicator means include a different width of said forward section extending through a portion of said predetermined minimum and maximum lip purchase limits.

3. A dock leveler as defined in claim 1, wherein said indicator means includes a portion for contacting a truck trailer to indicate when said ramp has reached said maximum lip purchase limit.

4. A dock leveler as defined in claim 1, wherein said portion for contacting a track trailer actuates a means for providing a warning when said ramp has reached said maximum lip purchase limit.

5. A dock leveler as defined in claim 1, wherein said means for extending said forward section relative to said rear section comprises a hydraulic cylinder.

6. A dock leveler for providing a bridge into the rear end of a truck trailer, said dock leveler comprising:
   a ramp having a rear section and an extendible forward section;
   means for extending said forward section relative to said rear section so as to place a portion of said forward section into the rear end of a truck trailer and thereby establish a degree of lip purchase;
   sensing means for sensing if said lip purchase is less than a predetermined minimum; and
   warning means responsive to said sensing means for providing a warning in the event the amount by which said portion of said forward section extends into the truck trailer falls below said predetermined minimum.

7. A dock leveler as defined in claim 6, wherein said forward section is supported at least in part by one channel member telescopingly received within a larger channel member.

8. A dock leveler as defined in claim 6 wherein said forward section is supported at least in part by a tubing member received within a larger tubing member.

9. A dock leveler as defined in claim 6, wherein at least part of said extendible forward section is supported on a relatively low friction material having a hardness less than that of other portions of said dock leveler.

10. A dock leveler as defined in claim 6, wherein said forward section is supported at least in part by link means.

11. A dock leveler for providing a bridge into the rear end of a truck trailer over which a fork vehicle can travel in loading the truck trailer, said dock leveler comprising:
    a ramp having a rear section and an extendible forward section;
    a hydraulic cylinder for extending and retracting said forward section relative to said rear section; and
    a selectively engageable check valve coupled to said hydraulic cylinder for locking said forward section relative to said rear section so as to prevent retraction of said forward section relative to said rear section under the traction developed by the drive wheels of a fork vehicle as the fork vehicle travels over said ramp.

12. A dock leveler as defined in claim 11, further including a pivotable lip coupled to said forward section.

13. A dock leveler as defined in claim 11, wherein said check valve is capable of remote disengagement.

14. A dock leveler as defined in claim 11, wherein at least one of said sections include metal pieces bent before welding to provide increased welding surface area.

15. A dock leveler as defined in claim 11, further including a means for sensing track trailer movement when the dock leveler is providing a bridge into the rear end of the truck trailer.

16. A dock leveler as defined in claim 15, wherein said means for sensing truck trailer movement includes an optical sensor.

17. A dock leveler as defined in claim 16 wherein said means for sensing truck trailer movement comprises a photoelectric sensor.

18. A dock leveler as defined in claim 15, wherein said means for sensing truck trailer movement includes a limit switch.

19. A dock leveler comprising:
    a ramp having a forward section receivable in a truck trailer; and
    indicator means for indicating when said forward section has been sufficiently received in a truck trailer so as to achieve a lip purchase between predetermined minimum and maximum lip purchase limits.

* * * * *